(12) United States Patent
Daum

(10) Patent No.: US 9,361,594 B2
(45) Date of Patent: Jun. 7, 2016

(54) GENERATING TIME SLOT FOR MANAGING TIME ACROSS MULTIPLE TIME ZONES

(71) Applicant: Andreas Daum, Heidelberg (DE)

(72) Inventor: Andreas Daum, Heidelberg (DE)

(73) Assignee: SAP SE, Walldorf (DE)

( * ) Notice: Subject to any disclaimer, the term of this patent is extended or adjusted under 35 U.S.C. 154(b) by 894 days.

(21) Appl. No.: 13/625,679

(22) Filed: Sep. 24, 2012

(65) Prior Publication Data

US 2014/0089719 A1    Mar. 27, 2014

(51) Int. Cl.
*G06Q 10/06* (2012.01)
*G06Q 10/10* (2012.01)

(52) U.S. Cl.
CPC ...... *G06Q 10/06311* (2013.01); *G06Q 10/1093* (2013.01)

(58) Field of Classification Search
CPC .................................................. G06Q 10/06311
See application file for complete search history.

(56) References Cited

U.S. PATENT DOCUMENTS

| | | | | |
|---|---|---|---|---|
| 4,608,693 A | * | 8/1986 | Baranyai ................. | G06F 11/10 370/217 |
| 5,649,164 A | * | 7/1997 | Childs ................. | G06F 17/5022 703/16 |
| 6,108,122 A | * | 8/2000 | Ulrich ................. | G09G 3/3629 345/204 |
| 8,301,176 B1 | * | 10/2012 | Yellin ............... | H04W 52/0229 455/458 |
| 2005/0117530 A1 | * | 6/2005 | Abraham .......... | H04W 52/0232 370/310 |
| 2006/0051059 A1 | * | 3/2006 | Krakirian ............... | H04N 5/782 386/293 |
| 2008/0147467 A1 | * | 6/2008 | Daum .................... | G06Q 10/06 705/7.21 |

OTHER PUBLICATIONS

Microsoft Corporation; How Outlook handles time zones for meeting requests; Copyright 2012 Microsoft; retrieved online on Sep. 24, 2012 ; 1 page; (http://support.microsoft.com/kb/195900).

Microsoft Corporation; Microsoft Office Outlook Tool: Time Zone Data Update Tool for Microsoft Office Outlook 32-bit; Copyright 2012 Microsoft; retrieved online on Sep. 24, 2012 ; 3 pages (http://www.microsoft.com/en-us/download/details.aspx?id=17291).

* cited by examiner

*Primary Examiner* — Mohammed Rehman

(57) ABSTRACT

A time slot of regular time length and capacity is defined in time local to a time zone. The slot is defined by a local time start timestamp and a local time end timestamp. In one aspect, upon determining that the local time end timestamp of the slot overlaps with the transition period, the time slot is prolonged beyond the transition period. The prolonged time slot is correspondingly defined by an international standard time start timestamp and an international standard time end timestamp. The prolonged time slot is generated based on the international standard time start timestamp and the international standard time end timestamp.

20 Claims, 11 Drawing Sheets

GENERATING TIME SLOT FOR MANAGING TIME ACROSS MULTIPLE TIME ZONES

BACKGROUND

In some industries, such as transportation, air traffic control or supply chain management, business processes and transactions may depend on accurate date and time. Computer systems often support global commercial transactions and processes that involve entities operating across multiple time zones around the globe. Typically, communication between the systems conforms to a common standard for date and time such as Universal Time (UT), Coordinated Universal Time (UTC), Greenwich Mean Time (GMT), or other international standards. For example, timestamps based on the respective date and time standard, may be assigned to the electronic messages exchanged between the systems. Establishing communication between the systems based on a common standard helps to synchronize clocks of the systems.

Generally, systems and applications are configured to operate in particular time zones. Common business need is displaying information to users with relevant date and time settings, i.e., in the local time zone of the users. For example, it is more convenient for users to schedule appointments, meetings, or other planning activities in their respective local time. A common scenario may be communication between systems across multiple time zones, where the systems operate with local time zone settings. Although communication between systems may be based on common date and time standard, the systems may be set to operate in their respective local times. The difference between the standardized time and the local times may generate confusion and inaccurate data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
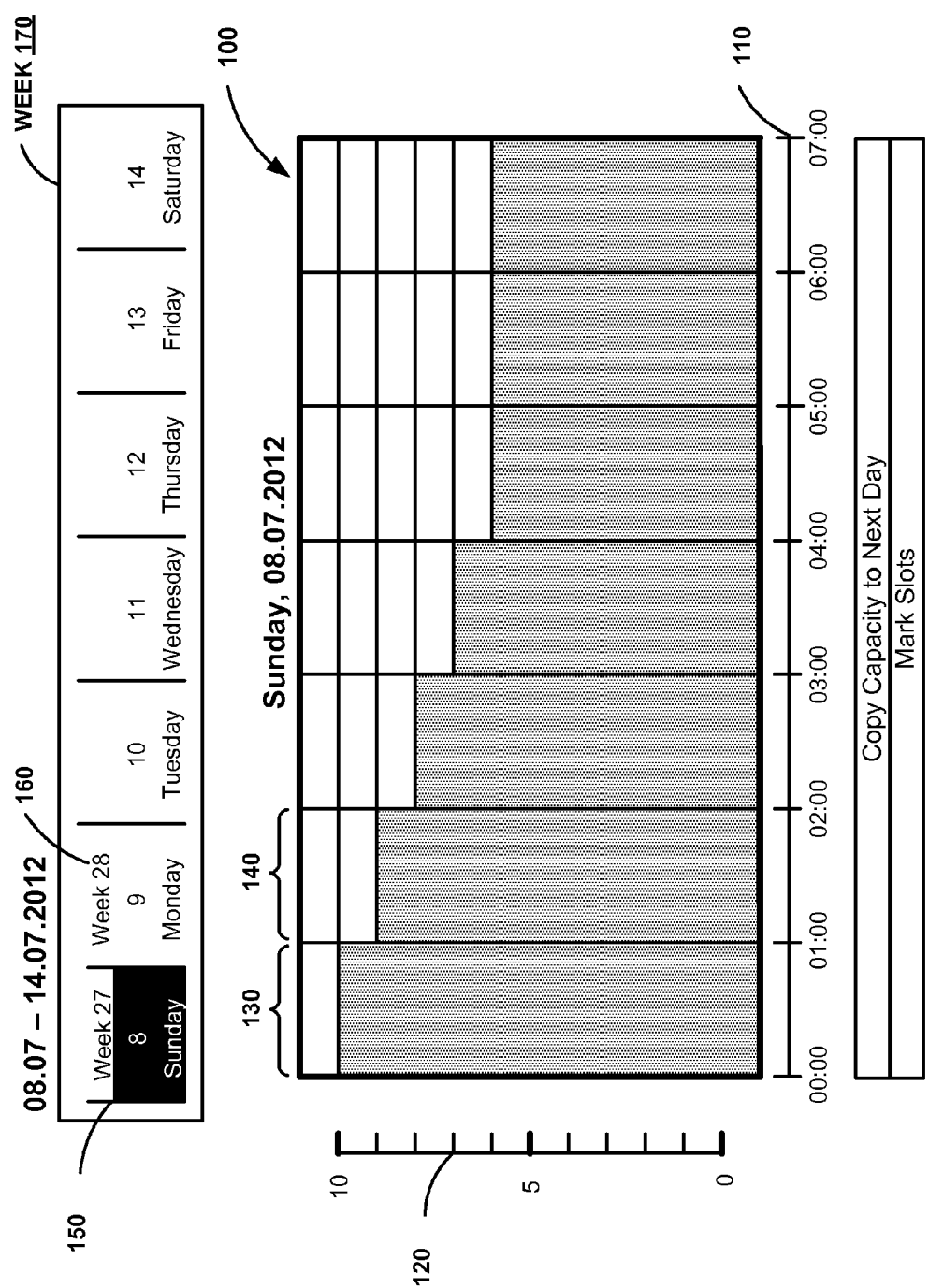
FIG. 1 is a block diagram illustrating an exemplary time grid with regular time pattern, according to one embodiment.

Embodiments of techniques for planning unambiguously across multiple time zones are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Nowadays, time zones across the globe are defined as positive or negative offsets from an international standard time such as UTC, UT, GMT or other global standard times. During most of the time of the year, the offset from the international standard time is fixed. For example, time zones are usually defined to differ from UTC by integer numbers of hours, although several jurisdictions have established time zones that differ by an integer number of half-hours or quarter-hours from UT or UTC. Typically, the international standard time does not change during seasons. In contrast, local time or civil time may change if a time zone jurisdiction observes daylight saving time (DST), also called summer time. For example, Central European Time (CET) during half of the year is defined as a positive offset of one hour from UTC. During the other half of the year Central European Summer Time (CEST) is defined as a positive offset of two hours from UTC. DST is a practice of advancing clocks so that evenings have more daylight and mornings have less. Typically, clocks are adjusted forward one hour near the start of spring and are adjusted backward in autumn Whether a DST practice is observed depends on the different jurisdictions, some choose to adopt DST, while others do not use DST.

In a typical case when DST starts in a time zone, a one-hour shift forward in time occurs. Hence, one hour is skipped in the time local to the time zone. The day clock round when DST starts is with twenty three hours in local time, instead of twenty four hours. Whereas, when DST ends, a one-hour shift backward in time occurs, repeating one hour twice. Thus, the day clock round in local time is twenty five hours when DST ends. The clock shifts due to DST may disrupt many activities that depend on accurate date and time. For example, activities that occur twenty four hours a day, seven days a week may be affected and put out of regular order.

A transition period is a period of time that results from changes in the regular time pattern of the day. The transition period may be an effect of changes in the standard movement of the clock round. The transition period is an interval of time defined by a starting and finishing time. The transition period is a range of time marked or defined by two instants, i.e., starting and finishing. In one embodiment, the transition period is an interval of time that is a consequence of the DST shifts. For example, a transition period may be the one hour that is skipped as a result of the shift to DST. Although, the skipped one hour is not present in local time, in this case the definition of the transition period corresponds to the skipped one hour interval. Another example may be the one hour that is repeated twice as a result of reversing the DST shift, e.g., as a result of shifting back to non-DST. In one embodiment, a transition period may be defined and scheduled for some time zones across the globe, while for others it may not occur. The time length of a transition period may be different for the different time zones, for example, it may also be with length of half an hour, quarter hour, or other length. In one embodiment, a transition period may be a consequence of any changes of the time local to a time zone that disrupt the regular time pattern of the day. Table 1 below illustrates exemplary DST shifts (1) and (2) in CET time zone.

TABLE 1

| Local date | Local time | DST | UTC offset | Time zone | Details |
|---|---|---|---|---|---|
| Sunday, 25 March 2012 | 01:59:59 (1) 02:00:00 → 03:00:00 | No +1 h | UTC + 1 h UTC + 2 h | CET CEST | DST starts |
| Sunday, 28 October 2012 | 02:59:59 (2) 03:00:00 → 02:00:00 | +1 h No | UTC + 2 h UTC + 1 h | CEST CET | DST ends |

In CET time zone, on Sunday, Mar. 25, 2012, as a result of the DST shift (1), the period of time from "02:00:00 AM" to "02:59:59 AM" is missing because the "02:00:00 AM" naturally arriving after 01:59:59 is instead changed directly to 03:00:00, Result of the shift to DST is a transition period or interval marked by the starting instant "02:00:00 AM" and the ending instant "02:59:59 AM" in CET. Due to the transition to DST, there is a period of time in UTC that it is omitted in local time. On Sunday, 28 Oct. 2012, in CET time zone, as a result of reversing to non-DST time, the period of time from "02:00:00 AM" to "02:59:59 AM" is repeated twice because the time is returned back to 02:00:00 AM when 03:00:00 AM is arriving. Result of DST backward shift (2) is a transition period marked by the starting instant 02:00:00 AM" and the ending instant "02:59:59 AM" in CET. Due to the end of the DST, there is a period of time in UTC that is repeated in local time. Thus, the transition periods result in ambiguities and discrepancies between the local time and the UTC time.

Often date and time information is converted from one time standard to another. For example, systems and applications are often configured to operate in particular time zones. However, such systems may also communicate with other systems operating globally. Since communication between the systems is typically based on common date and time standard, often local date and time is converted to the common international standard time for the systems to communicate accurately across multiple time zones. Local date and time can be converted to a corresponding international standard time based on the time zone and the defined offset from the international standard time in this time zone. However, during the DST shifts, the transition periods in local time are not correspondingly defined in the international standard time.

The lack of correspondence between the transition periods in local time and the international standard time may result in discrepancies in the information that is communicated between systems. For example, in case activities during the transition periods are scheduled in the systems that operate in one time zone, inaccurate or ambiguous information may be communicated to a system operating in a different time zone. In one embodiment, a method to accurately convert periods of time defined in local time to an international standard time is implemented. Periods defined in local time that can be unambiguously converted to an international standard time, could also be safely communicated between systems operating across multiple time zones.

Date and time information for planning or time management may often be formatted or arranged in time grids. A time grid may be a pattern of regularly spaced time slots. A time grid with regular pattern of the time is based on time slots with regular time length. A time slot is a period, range or interval of time with a starting and finishing time. A time slot is a definite length of time marked or defined by two instants. For example, the time slot may be defined by a start timestamp and an end timestamp of the slot. In one embodiment, a time slot may be defined by a starting time and time length of the slot. In time grid, time slots are ordered as a sequence, where the end time of each slot is the start time of the next slot in the sequence.

In one embodiment, the time slot may be a period of time allocated and assigned on a schedule or agenda. A time slot may be a unit that can be generated in a schedule. The time slot may be the standard unit that can be booked for a resource. An appointment can be allocated to one or more time slots. Different statuses that a time slot can have include, but are not limited to, "booked"—if an appointment is allocated to the time slot; "blocked"—if a time slot is reserved for special purposes, for example, maintenance; and "free"—if a time slot is available for planning. Any type of event, activity, business task or process, etc., may be associated with or scheduled at a time slot. Time slots may indicate various business dates such as appointments, schedules, meetings, plans, etc.

FIG. 1 illustrates an exemplary time grid 100 with regular time pattern, according to one embodiment. Time grid 100 illustrates structured and systemized time slots that are available for activities to be planned during the slots. Time grid 100 includes regularly spaced time slots with regular or standard time length. Slots illustrated in time grid 100 are with constant or consistent slot width to illustrate the regular time length of the slots. The rectangles that are formed by the pattern of regularly spaced horizontal and vertical lines illustrate time slots of time grid 100, for example, time slot 130 and time slot 140. Time grid 100 includes generated time slots for Sunday, Jul. 8, 2012. Any type of activities may be planned or scheduled during the time slots of time grid 100. Horizontal axis 110 illustrates and marks the starting and the ending time of the slots. For example, time slot 130 starts at "00:00 AM" until "01:00 AM", time slot 140 starts at "01:00 AM" and ends at "02:00 AM", and so on. In FIG. 1, illustrated time slots are with regular time length, e.g., one hour length of the slot.

In one embodiment, a capacity may be associated with a time slot. A capacity of a time slot may indicate an amount of work, or other activity that can be associated to the slot that is expected to be performed or produced during the time period of the slot. The capacity of a time slot may indicate an average amount of work that is typically performed for the time and duration of the slot. Alternatively, the capacity of the slot may represent maximum amount of work. Vertical axis 120 illustrates a scale of the capacity, which can be assigned to or associated with time slots of time grid 100. For example, the scale illustrated with vertical axis 120 is from zero to ten. In FIG. 1, maximum capacity of "10" is assigned or associated to time slot 130, and capacity of "9" is assigned to time slot 140.

In a planning period, time slots may be ordered in a sequence. In one embodiment, a planning period is a period of time that includes a sequence of time slots, where the end of one slot is the start of the next slot. For example, in a planning period, a start timestamp of a slot is equal to an end timestamp of the previous slot. Thus, the sequence of slots may be defined without gaps in time. In one embodiment, a planning period is a period with generated time slots of regular time length and with capacity assigned to the slots. Example of a planning period is a week with generated time slots and associated capacity such as Week '27' 150, Week '28' 160, or Week 170 from Jul. 8,2012 to Jul. 14, 2012. The planning period is with regular pattern of time defined based on ordered standard time slots with regular length and assigned capacity. In one embodiment, time slots of a planning period are available for scheduling and planning activities. Examples of time lengths of a planning period include, but are not limited to, a working week of five or whole week of seven days, a month, a day, a single slot, and so on.

When a planning period such as a time slot is communicated across systems, the starting and finishing time and date of the planning period are transmitted or exchanged between the systems. In one embodiment, if the time slot overlaps with a transition period, the time slot is prolonged beyond the transition period. The starting and the finishing time of the slot are changed to points in time that are correspondingly defined in an international standard time and can be accurately converted to the international standard time.

Figure 2:
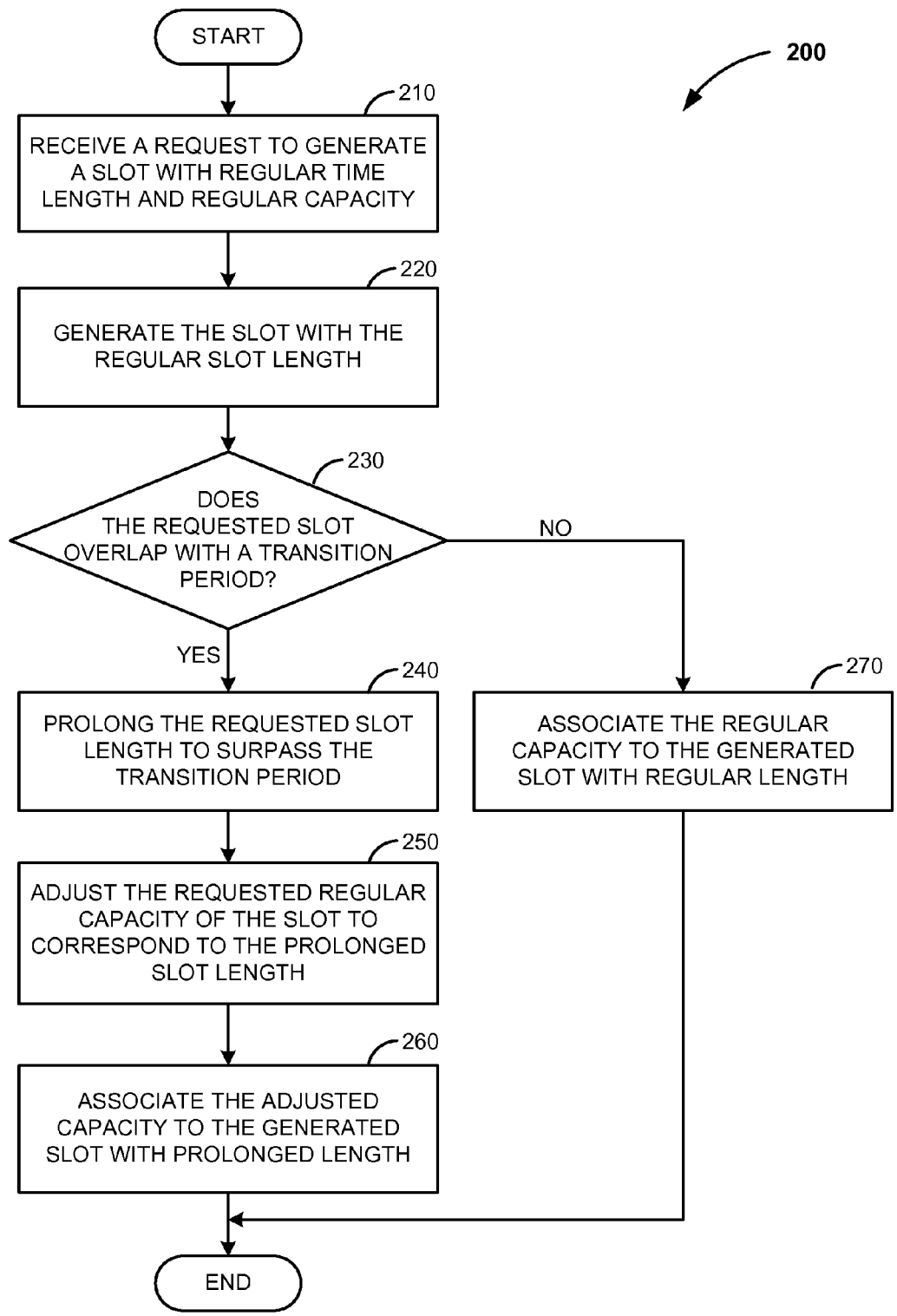
FIG. 2 is a flow diagram illustrating a process to generate a prolonged time slot, according to one embodiment.

FIG. 2 illustrates process 200 to generate a prolonged time slot, according to one embodiment. At 210, a request to generate a slot with regular time length and regular capacity is received. It is typical that slots generated in a time grid have standard time length. Also, regular capacity may be typically assigned to particular slots of the time grid. The regular time pattern of a time grid is based on time slots with standard time length. In one embodiment, the received request includes information for the requested time slot. For example, the request may include date and time information for the requested slot such as time zone in which the slot is to be generated, time length of the slot, beginning time of the slot, finishing time of the slot, and so on. Further information associated with the requested time slot may include capacity of the slot. Commonly, slots with regular time length that start at a particular moment of the day have also associated regular capacity, where the capacity may depend on the time length of the slot and on the date and time of the slot. In one embodiment, the request is to generate the slot in time of a particular time zone. At 220, the requested slot is generated with the requested regular length.

At 230, a check is performed if the requested time slot overlaps with a transition period. In one embodiment, the requested time slot overlaps with a transition period if the end timestamp of the slot is a point in time that belongs to the time interval of the transition period. In another embodiment, the requested time slot overlaps with a transition period if the start timestamp of the slot is a point in time that belongs to the time interval of the transition period. If the requested time slot overlaps with a transition period, at 240, the requested length of the slot is prolonged beyond the transition period. In one embodiment, the borders of the slot are moved in time to occur beyond the transition period. For example, the end timestamp of the requested slot can be extended to surpass or exceed the transition period. In one embodiment, the requested time length of the slot may be prolonged by adding the regular time length to the requested length of the slot. In another embodiment, the end timestamp of the slot may simply be moved until a second or other period after the end of the transition period. Similarly, the start timestamp of the slot may be moved a second or other period before the start of the transition period. In one embodiment, the requested length of the slot may also be shortened. If the regular time length of the slot is longer than the time length of the transition period, then by shortening the slot, the start or the end timestamps of the slot may be moved to points in time that are outside the borders of the transition period.

By prolonging a regular slot beyond a transition period, the starting and the finishing time of the slot are changed to points in time that are correspondingly defined in an international standard time. Thus, the starting and finishing time of the slot are moved to points in time that can be accurately converted to the international standard time or other time standards. Since the slot can be accurately converted to a standard time, the slot can also be accurately defined and represented in multiple time zones based on the standard time. Thus, date and time information can be accurately communicated among integrated systems across multiple time zones based on the international standard time.

Since the regular capacity may depend on the time length of the requested slot, the requested regular capacity may also be adjusted in response to prolonging the slot. At 250, the requested regular capacity of the slot is adjusted or adapted to correspond to the prolonged length of the slot. In one embodiment, the regular capacity of the slot may be increased or otherwise adjusted by multiplying the regular capacity by a prolongation factor. The prolongation factor may be a ratio between the prolonged time length of the slot as represented in the international standard time and the requested regular time length. The prolongation factor depends on the regular length of the requested slot and on the length of the prolonged slot as defined in the international standard time. In one embodiment, if the slot is shortened instead of prolonged, the capacity may be decreased instead of increased. Similarly, a shortening factor may be calculated that is based on the regular length of the requested slot and the length of the shortened slot as defined in the international standard time.

At 260, the adjusted capacity is associated to the generated slot with prolonged length. If the requested time slot does not overlap with a transition period, at 270, the requested regular capacity is associated to the generated slot with regular length.

Figure 3A:
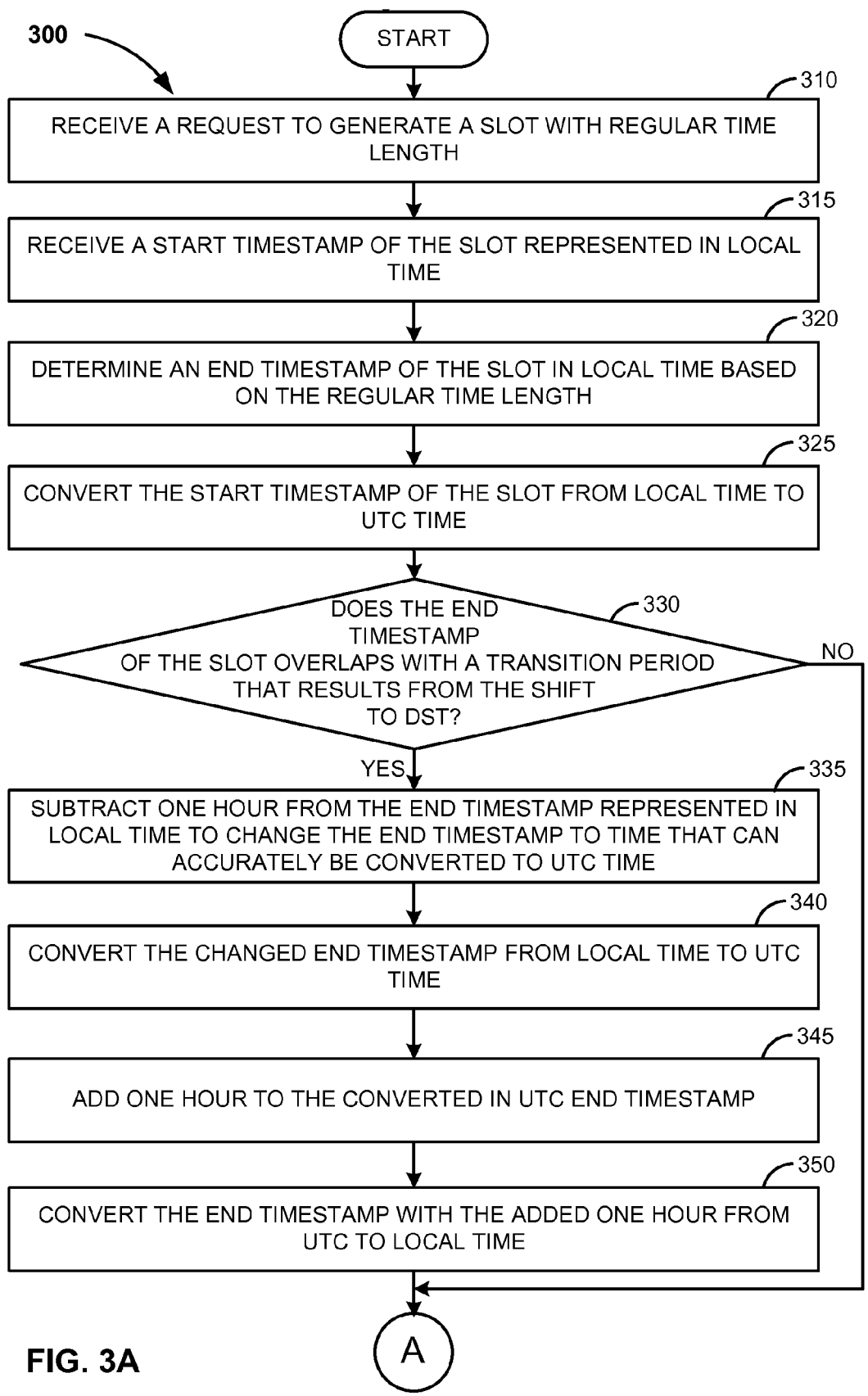
FIG. 3A is a flow diagram illustrating a slot prolongation process to prolong a time slot that overlaps with a transition period that is a result of a shift to daylight saving time (DST), according to one embodiment.

FIG. 3A illustrates slot prolongation process 300 to prolong a time slot that overlaps with a transition period that is a result of shift that starts DST, according to one embodiment. At 310, a request to generate a slot with regular time length is received. In one embodiment, the request is to generate a time slot in time local to a particular time zone. At 315, a start timestamp of the slot represented in local time is received. Local time may be time defined in any time zone across the globe. At 320, the end timestamp of slot in local time is determined based on the regular time length of the requested slot. For example, the end timestamp is determined by adding the requested regular time length to the start timestamp of the slot. At 325, the start timestamp of the slot is converted from local time to UTC time. In one embodiment, the conversion is based on the local time zone information including information if DST practice is observed or not.

At 330, a check is performed if the end timestamp of the requested slot overlaps with a transition period that is a result of the shift that starts DST. The end timestamp of the requested slot overlaps with the transition period if the end timestamp of the slot represented in local time is a point in time that belongs to transition period. If the end timestamp of the requested time slot overlaps with the transition period that is a result of the shift that starts DST, at 335, in local time, one hour is subtracted from the end timestamp of the slot. The end timestamp is shifted backward in time with one hour to change the end timestamp to time that can be accurately and unambiguously converted from local time to the UTC time. Thus, the end timestamp is moved back in time before the start of the transition period and before the start of DST. The end timestamp is shifted backward in local time beyond the transition period. In one embodiment, the end time timestamp is moved with one hour. In other embodiments, the end timestamp may be moved backward in time with other time lengths, such as lengths equal to the length of the transition period. In one embodiment, the end timestamp is moved backward with time length equal or more than the transition period. In one embodiment, one hour is subtracted regardless of the particular time zone, and regardless of the standard length of the slot. In case a jurisdiction observes a DST that shifts the clock round with more than one hour, other length equal or more than the transition period may be subtracted.

Because the changed end timestamp is a point in time in local time that is correspondingly defined in UTC, the changed end timestamp can be reliably and unambiguously converted from local time to UTC time. At 340, the changed end timestamp is converted from local time to UTC time. The conversion is based on the corresponding local time zone and the defined offset from UTC in this time zone without DST.

At 345, one hour is added to the converted in UTC end timestamp. The hour or other period that is subtracted at 335 is added back to the UTC end timestamp of the slot. In one embodiment, other time length subtracted at 335 may be added back to the converted in UTC end timestamp. At 350, the end timestamp with the added one hour is converted back from UTC to time local to the particular requested time zone. By converting the end timestamp back to local time, the requested length of the slot is prolonged beyond the transition period that starts DST. In one embodiment, in response to prolonging the slot, an adjusted corresponding capacity is associated with the prolonged slot. In one embodiment, the requested regular capacity of the slot is increased to correspond to the prolonged length of the slot represented in UTC time. In one embodiment, the adjusted capacity of the slot is based on a ratio between the requested regular time length and the duration of the prolonged slot represented in UTC.

To illustrate with reference to Table 1. A request to generate a slot in CET time is received. The slot is requested to be generated from "01:00:00 AM" to "02:00:00 AM" on Sunday, 25 Mar. 2012 in local CET time. According to process 300, the start timestamp "01:00:00 AM" is converted from local time to UTC, thus in UTC time the start timestamp "01:00:00 AM" is converted to "00:00:00 AM" in UTC time. The conversion is based on the offset from UTC without DST, i.e., the offset is positive integer of one hour from UTC. The end timestamp "02:00:00 AM" of the requested slot is a point in time that belongs to the transition period that is a result of the shift that starts DST. According to process 300, one hour is subtracted from the end timestamp "02:00:00 AM", moving the end timestamp back in local time to "01:00:00 AM". Since the end timestamp is changed to "01:00:00 AM", which is a point in time that is correspondingly defined in UTC, the changed end timestamp "01:00:00 AM" can be converted from local time to UTC. Thus, the end timestamp is converted from "01:00:00 AM" in local time to "00:00:00 AM" in UTC time. The conversion is based on the offset of CET from UTC without DST, e.g., UTC+1 h. Then, one hour is added back to the end timestamp "00:00:00 AM" in UTC time, changing the end timestamp from "00:00:00 AM" to "01:00:00 AM" in UTC. Then, the end timestamp "01:00:00 AM" in UTC is converted from UTC to local time, converting the end timestamp to "03:00:00 AM" in local time. Thus, the requested time slot from "01:00:00 AM" to "02:00:00 AM" in local time is prolonged to a period from "01:00:00 AM" to "03:00:00 AM" in local time. Also, the slot is correspondingly represented in UTC as a period from "00:00:00 AM" to "01:00:00 AM". The prolonged slot from "01:00:00 AM" to "03:00:00 AM" in local time has duration of one hour in UTC time (i.e., "00:00:00 AM-01:00:00 AM"). In such case, the prolongation factor is equal to one, since the length of the requested slot has duration of one hour and also the time length of the prolonged slot as represented in UTC has duration of one hour. Thus, the requested regular capacity of the slot does not change since to be adjusted it is multiplied by a factor that equals one.

Figure 3B:
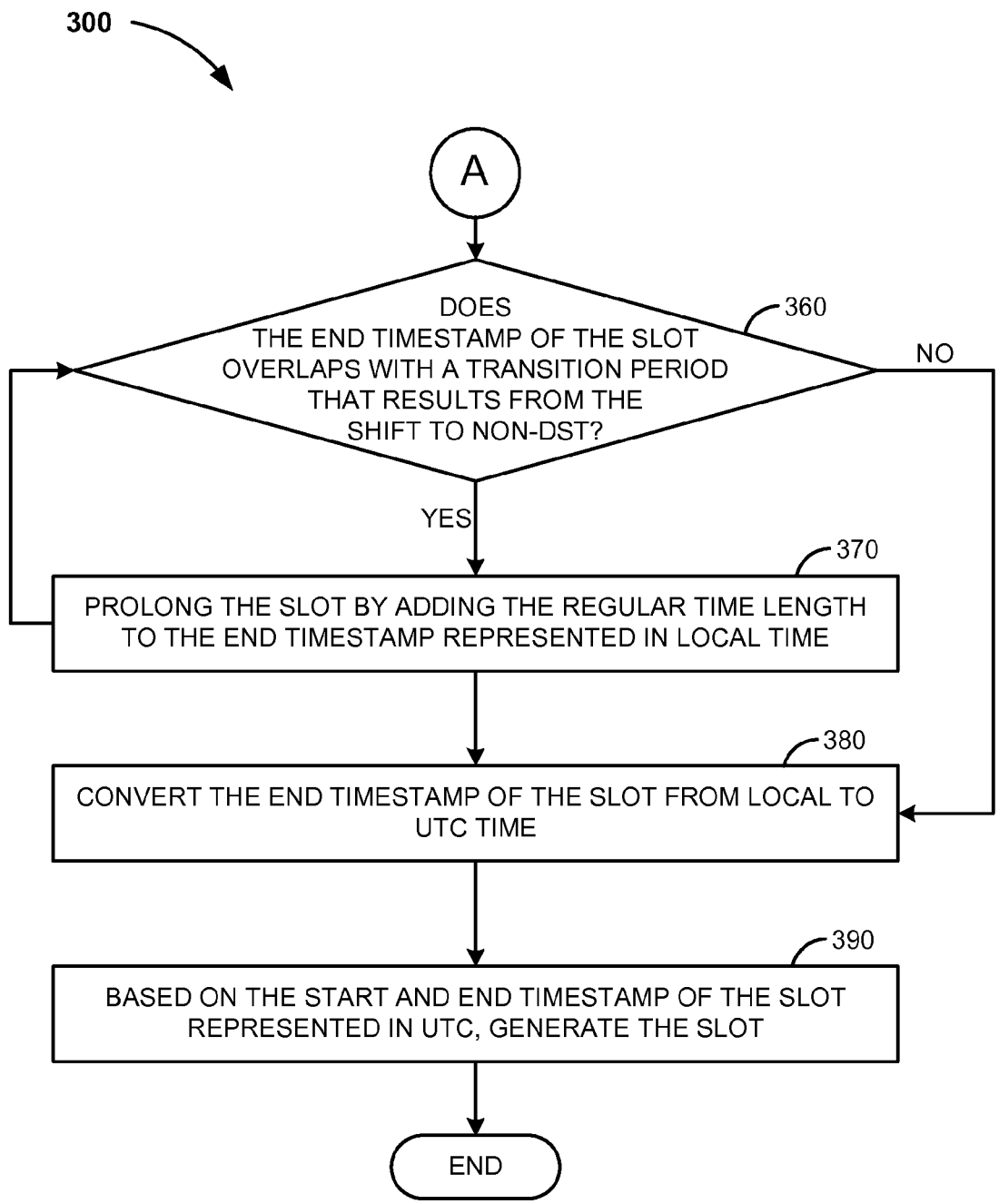
FIG. 3B is a flow diagram illustrating a slot prolongation process to prolong a time slot that overlaps with a transition period that is a result of a shift that ends DST, according to one embodiment.

If the end timestamp of the requested time slot does not overlap with a transition period that is a result of a shift that starts DST, process 300 continues. FIG. 3B illustrates process 300 to prolong a time slot that overlaps with a transition period that is a result of a shift that ends DST, according to one embodiment. At 360, a check is performed if the end timestamp of the requested time slot overlaps with a transition period that is a result of a shift that ends DST.

If the end timestamp of the requested slot overlaps with a transition period that is a result of the shift that ends DST, at 370, the slot is prolonged by adding the regular time length to the end timestamp of the slot represented in local time. In one embodiment, the regular time length is added to the end timestamp of the slot until the end timestamp is moved forward in time beyond the transition period. For example, if the regular time length is less than one hour, the slot may be prolonged more than once until the slot is extended beyond a one-hour transition period.

After moving forward in time the end timestamp until the requested time slot does not overlap with a transition period that is a result of the shift that ends DST, at 380, convert the end timestamp of the slot from local time to UTC time. In one embodiment, the prolonged end timestamp of the slot is converted from local time to UTC time. The conversion is based on the corresponding local time zone and the defined offset from UTC in this time zone without DST.

To illustrate with reference to Table 1. A request to generate a slot in CET time is received. The slot is requested to be generated from "01:00:00 AM" to "02:00:00 AM" on Sunday, 28 Oct. 2012 in local CET time. According to process 300, the start timestamp "01:00:00 AM" is converted from local time to UTC, thus in UTC time the start timestamp "01:00:00 AM" is converted to "11:00:00 PM" in UTC time. The conversion is based on the offset from UTC with DST, i.e., the offset is positive integer of two hours from UTC. Then, it is determined that the end timestamp "02:00:00 AM" of the requested slot is a point in time that belongs to the transition period that is a result of the shift to non-DST. Thus, the requested slot overlaps with the transition period. The requested slot is prolonged by adding one hour to the end timestamp "02:00:00 AM" in local time. The end timestamp is extended from "02:00:00 AM" to "03:00:00 AM". Then, the end timestamp "03:00:00 AM" is converted from local time to UTC time. Thus, the end timestamp "03:00:00 AM" in local time is converted to "02:00:00 AM" in UTC time. Thus, the requested time slot from "01:00:00 AM" to "02:00:00 AM" in local time is prolonged to a period from "01:00:00 AM" to "03:00:00 AM" in local time. Also, the slot is correspondingly represented in UTC as a period from "11:00:00 PM" to "02:00:00 AM". The prolonged slot from "01:00:00

AM" to "03:00:00 AM" in local time has duration of three hours in UTC time (i.e., "11:00:00 PM-02:00:00 AM"). In such case, the prolongation factor is equal to three, since the length of the requested slot has duration of one hour and the time length of the prolonged slot as represented in UTC has duration of three hours. Thus, the requested regular capacity of the slot is increased three times, since to be adjusted it is multiplied by a factor that equals three.

At 390, based on the start and end timestamp of the requested slot that are represented in UTC the slot is generated. In one embodiment, the prolonged time slot that is converted in UTC time is generated. The timestamps of the slot may be converted to other common global standards for date and time information in addition to UTC. Slot prolongation process 300 prolongs a time slot that overlaps with a transition period and converts the time slot to an international standard time such as UTC. In one embodiment, slot prolongation process 300 prolongs the time slot by moving the end timestamp forward in time. In another embodiment, the start timestamp of the slot may be moved backward in time beyond the transition period. In such embodiment, also it may be checked if the start timestamp belongs to the transition period instead of the end timestamp.

Figure 4:
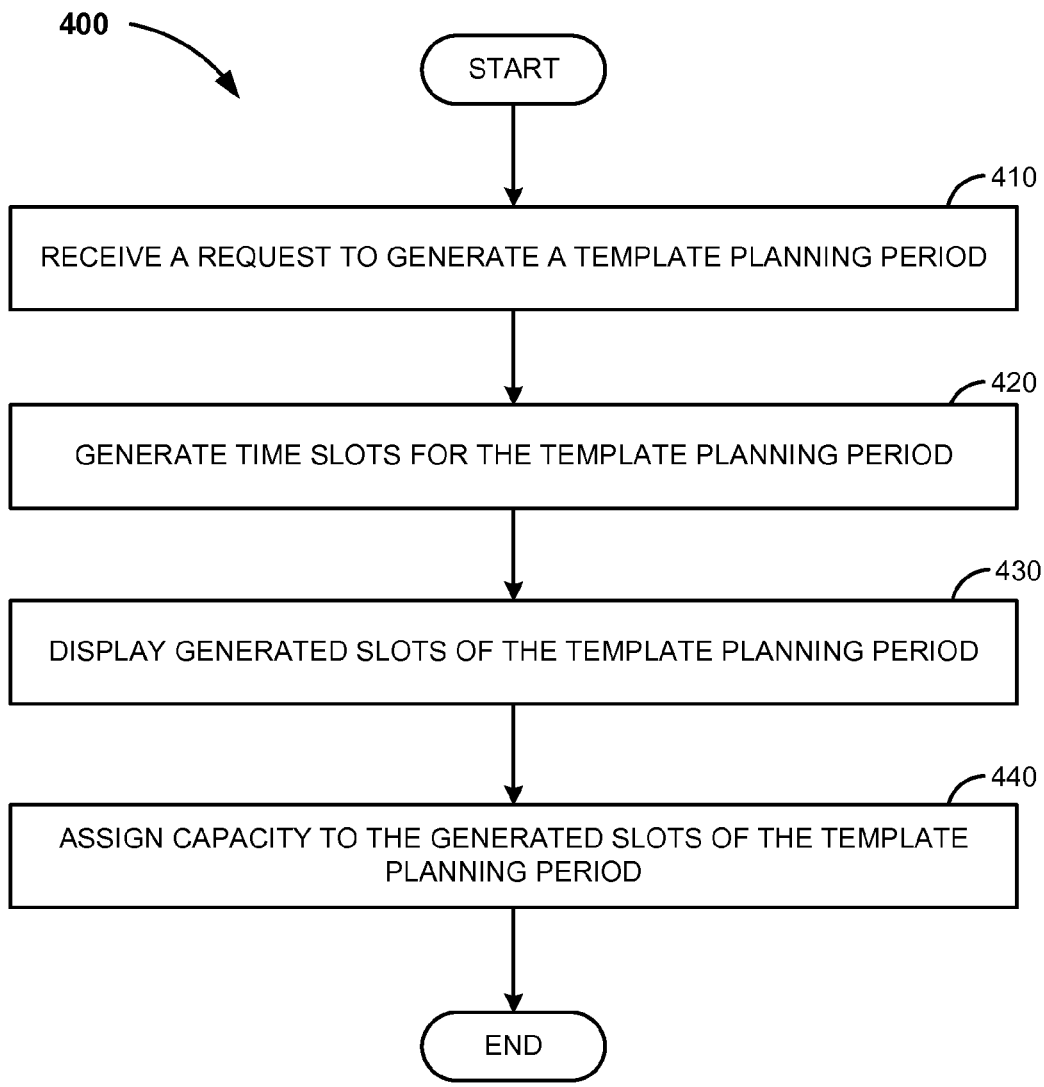
FIG. 4 is a flow diagram illustrating a process to generate a template planning period, according to one embodiment.

FIG. 4 illustrates process 400 to generate a template planning period, according to one embodiment. At 410, a request to generate a template planning period is received. Just as an example, a template planning period may be a week with generated sequence of standard time slots such as week 150, week 160, and week 170 in FIG. 1. In one embodiment, the request includes start and end date and time information of the requested template planning period. Other information that may be specified in the request includes, but it is not limited to, time zone information, standard slot length, and also standard slot capacity. In one embodiment, standard data is associated with a standard template planning period.

At 420, time slots of the template planning period are generated. In one embodiment, a sequence of time slots with regular length is generated for the template planning period. In one embodiment, if a time slot overlaps with a transition period, the time slot is prolonged and generated according to process 300 illustrated in FIG. 3A-3B. If a slot overlaps with a transition period that is a result of the shift that starts or ends DST, the slot is prolonged beyond the transition period.

At 430, the generated time slots of the template planning period are displayed. In one embodiment, the template planning period may be displayed in a time grid on a graphical user interface (GUI). At 440, capacity is assigned to the generated slot of the template planning period. Capacity may be manually assigned to the generated time slots of the template planning period, for example, a user of the slot generation system may define the capacity. Time slots of the template planning period may be generated with zero capacity, according to one embodiment.

Figure 5:
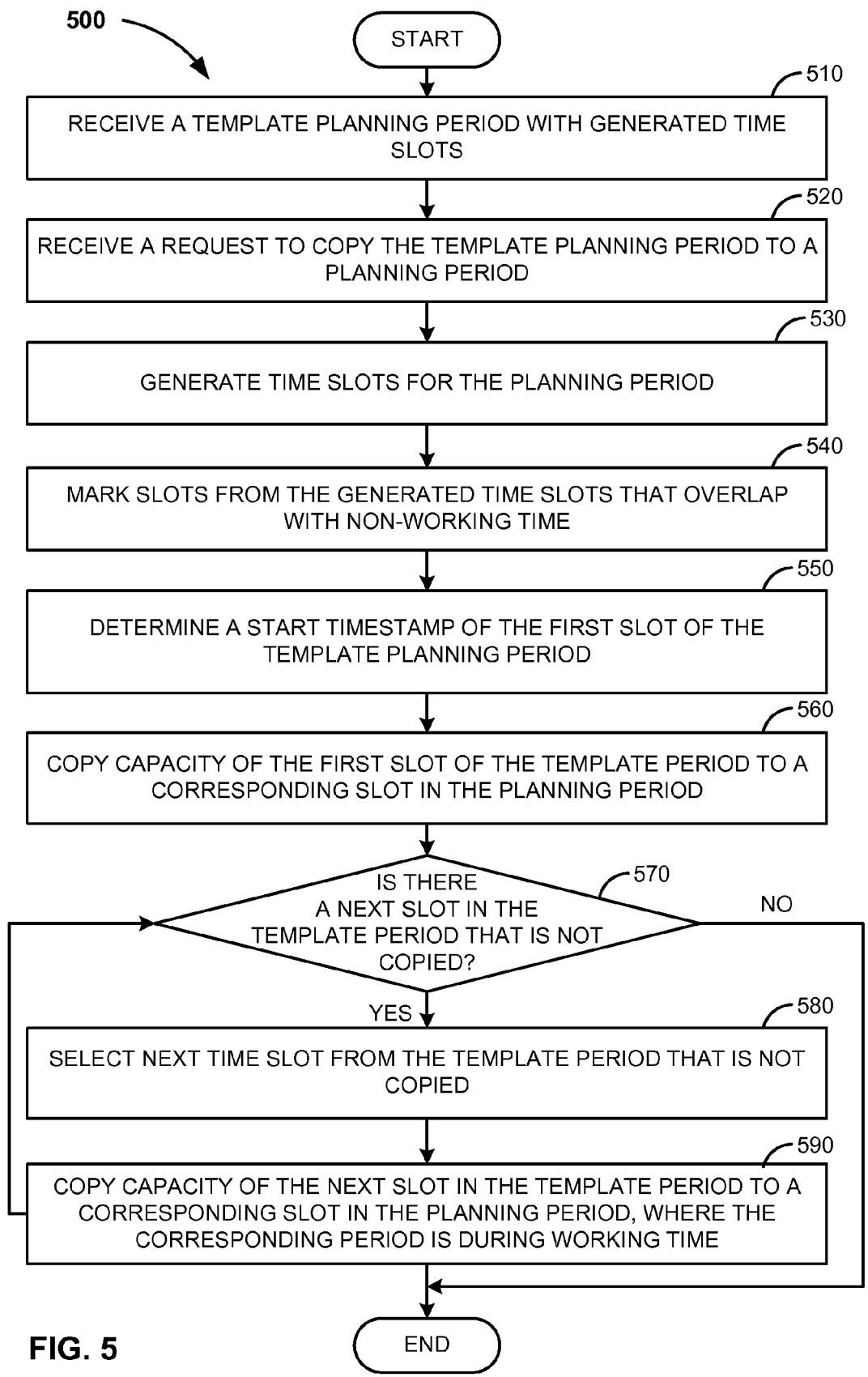
FIG. 5 is a flow diagram illustrating a process to copy a template planning period to a planning period, according to one embodiment.

FIG. 5 illustrates process 500 to copy a template planning period to a planning period, according to one embodiment. At 510, a template planning period with generated time slots is received. The time slots of the template planning period are ordered in a sequence. In one embodiment, the received template planning period is a period with generated time slots of regular time length and associated template capacity, where the end of one slot is the start of the next slot. At 520, a request to copy the template period to a planning period is received. For example, the request may be to copy a template week with generated standard slots to the next following week. In one embodiment, if a planning period includes a slot that is prolonged because it overlaps with a transition period, a request to copy the planning period may be denied. Such period includes a slot with length different than the regular length and copying it as template to other regular planning periods may be improper.

At 530, time slots of the planning period are generated. A sequence of time slots with regular length is generated for the planning period, where the end of one slot is the start of the next slot. In one embodiment, times slots of the planning period are generated in accordance with process 200 in FIG. 2 and process 300 in FIG. 3A-3B. In one embodiment, if a time slot overlaps with a transition period, the standard length of the slot is prolonged to exceed the transition period. Generated time slots of the planning period may be represented in and converted to both local time and common global standard time.

Once time slots of the planning period are generated, time slots that overlap with non-working time may be determined. At 540, generated time slots of the planning period that overlap with non-working time are marked. For example, based on information for working time in the local time zone, time slots that overlap with a period of time during non-working hours are marked as such.

At 550, a start timestamp of the first slot of the template planning period is determined. Based on the start date and time of the template period, the start timestamp of the first slot of the planning period is determined. At 560, capacity of the first slot of the template period is copied to a corresponding slot in the planning period. In one embodiment, capacity of the first slot of the template period may not be copied to the corresponding slot in the planning period if the corresponding slot is marked as overlapping with non-working times. Slots in the planning period that overlap with non-working times keep a zero capacity.

In one embodiment, the start timestamp of the first slot of the planning period may be defined as the start timestamp of the first slot of the template period. For example, the start timestamp of the first slot of the planning period may be at the same date and time in a time local to the particular time zone as the start timestamp of the template period. Thus, a particular calendar week may be defined as both a template period and as a planning period. That way, the standard capacity pattern particular to a specific calendar week (e.g., particular to the dates and time of the calendar week) may be copied to following weeks. In case transition periods occur during the planning period, capacity of a prolonged slot of the planning period may be accordingly adjusted by a prolongation factor and not merely copied.

At 570, a check is performed if there is a next slot in the template period that is not copied yet. If there is a next slot in the template period that is not copied yet to the planning period, at 580, next slot that is not copied is selected. In one embodiment, next time slot that is not copied in the template period is determined based on a start timestamp in UTC time of the next slot, which start timestamp is identical to the end timestamp of the last copied template slot.

At 590, capacity of the next slot in the template period is copied to a corresponding time slot in the planning period. In one embodiment, the capacity is copied to a corresponding slot that is not occurring during non-working time. Time slots of a template planning period may be with different capacity assigned. For example, during the different hours of the day, different work force and other resources might be available for performing the work. Thus, different capacity may be assigned to the template slots of the template period. Thus, capacity of the template slots is copied to corresponding slot in the planning period. In one embodiment, capacity of slots from the sequence of slots of the template period is iteratively copied.

Figure 6A:
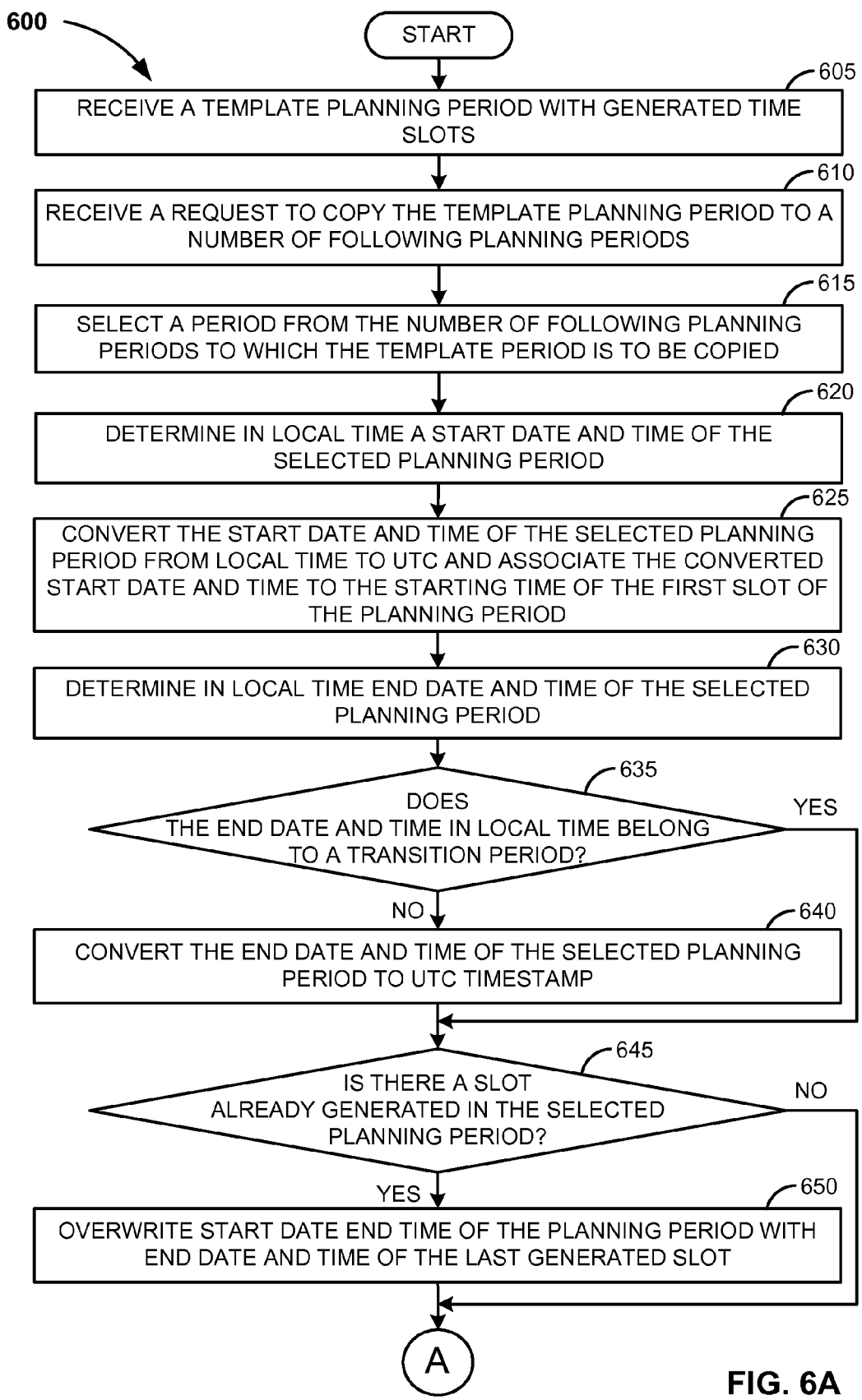
FIGS. 6A and 6B are flow diagrams illustrating a process to copy a template planning period to a number of following planning period, according to one embodiment.
Figure 6B:
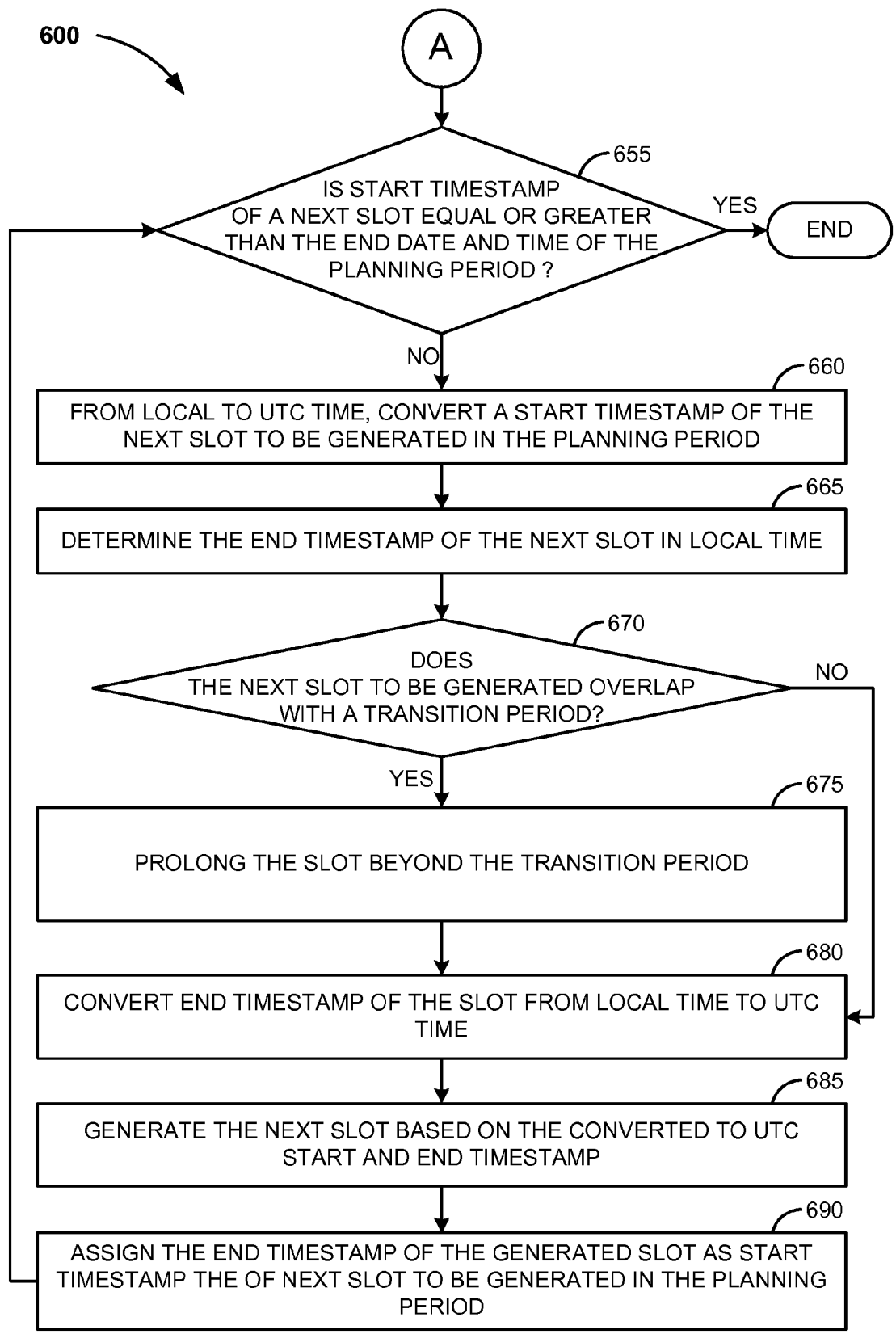

FIGS. 6A and 6B illustrate process 600 to copy a template planning period to a number of following planning periods, according to one embodiment. At 605, a template planning period with generated time slots is received. At 610, a request to copy the template planning period to a number of following or upcoming planning periods is received. In one embodiment, the following planning periods are ordered in a sequence. For example, a request may be received to copy a template week to the next follow-up 52 weeks, generating standard time slots for a whole year. In the sequence of following planning periods, the end date and time of a planning period from the sequence of planning periods is the start date and time of the next planning period in the sequence. In one embodiment, the end date and time of the template period is a start date and time of the first planning period in the sequence of following planning periods.

At 615, a planning period from the number of following planning periods is selected to which period the template period is to be copied. In one embodiment, periods from the number of following planning periods are selected one by one in accordance with the sequence of the following planning periods. At 620, a start date and time of the selected planning period is determined in local time. At 625, the determined start date and time of the selected planning period is converted from local time to UTC. Further, the converted UTC starting time of the planning period is associated also as a starting time of the first slot of the planning period. In one embodiment, the starting time of the planning period is a finishing time of a preceding planning period. In accordance with processes described herein, the finishing time of the preceding planning period is generated beyond a transition period, and thus is correspondingly convertible to UTC.

At 630, end date and time of the selected planning period is determined in local time. The end time of the selected planning period may be determined based on the starting time of the period and the time length of the template period. At 635, a check is performed if the determined end date and time in local time belongs to a transition period. If the end date and time of the selected planning period is not a point in time that belongs to a transition period, at 640, the end date and time of the planning period is converted from local time to UTC. In one embodiment, the template planning period and the following planning periods represent calendar weeks. Start and end date and time of calendar weeks according to current DST practice do not overlap with a transition period. Accordingly, if the end date and time of the selected planning period belongs to a transition period, the process may stop, according to one embodiment.

At 645, a check is performed if there is a slot that is already generated in the selected planning period. For example, if the end timestamp of the preceding planning period belongs to the selected planning period, then there is a slot that is already generated and that belongs to the selected planning period. If there is a slot that is already generated in the selected planning period, at 650, the start date and time of the planning period is overwritten with the end date and time of the latest existing slot. For example, the start date and time of the planning period may be assigned the ending time of the last slot of the preceding planning period.

At 655, a check is performed if a start timestamp of a next slot is equal or greater than the end date and time of the planning period. If the start timestamp of the next slot is equal or greater than the end date and time of the planning period, then the time slots for the planning period are already generated. In one embodiment, once time slots of the planning period are generated automatically, capacity of the slots of the template period is copied to the selected planning period in accordance with process 500 in FIG. 5.

If the start timestamp of the next slot is less than or before the end date and time of the planning period, at 660, a start timestamp of next slot to be generated in the planning period is converted from local time to UTC time. At 665, the end timestamp of the next slot is determined in local time. At 670, a check is performed if the next slot to be generated overlap with a transition period. If the next slot overlaps with a transition period, at 675, the slot is prolonged beyond the transition.

At 680, the end timestamp of the next slot to be generated is converted from local time to UTC time. In one embodiment, in case the next slot to be generated overlaps with a transition period, the prolonged end timestamp of the next slot is converted from local time to UTC time. At 685, the next slot is generated based on the start and end timestamps of the next slot that are converted UTC. Thus, start and end timestamp of generated slots are also kept and represented in UTC time in addition to the local time.

At 690, the end timestamp in UTC time of the generated time slot is assigned or set as a start timestamp of a next slot to be generated in the planning period. Thus, since the start timestamps are identical with end timestamps of preceding slots, start time of slots are also points in time that are correspondingly convertible to UTC.

In one embodiment, generated slots for the planning period are generated in a sequence of slots with regular time length. For example, the generated planning period is generated based on a pattern of slots with standard time length such as in a time grid (e.g., time grid 100 in FIG. 1). In case a slot in the planning period that overlaps with a transition period is prolonged, the pattern of the planning period is nevertheless sustained. Slots are generated in sequence, where the end timestamp of each slot is identical to the start timestamp of the next slot in the sequence of slots of the planning period.

In one embodiment, once time slots of the planning period are generated, capacity of the slots from the template period may be correspondingly copied. Further, process 600 may continue with generating a next planning period from the sequence of planning periods and copying the template period to the next planning period until requested number of following planning periods are generated.

It is common that time slots are generated for a particular planning period, where the start timestamp of each slot in the sequence is the end timestamp of the preceding slot with the exception of the first slot. For example, it is common that time slots are generated for a calendar week. The first slot in the sequence has a start timestamp that typically does not overlap with a transition period, for example, timestamp "00:00:00" at midnight between Sunday and Monday is a common starting time of the first slot. Such "00:00:00" timestamp according to current DST practice typically does not overlap with transition periods. On one hand, usually the first slot in the sequence is with start timestamp that is accurately convertible to an international standard time. Also, as illustrated in FIG. 3A-B, slot prolongation process 300 prolongs a time slot by moving the end timestamp forward in time if the end timestamp overlaps with a transition period. On the other hand, slots in the sequence except for the first slot has a start timestamp that is identical to the end timestamp of the previous slot, which end timestamps are accurately convertible to an international standard time in accordance with slot prolongation process 300. Thus, typically start timestamps of slots of a planning period are accurately convertible to a standard time, and only end timestamps may have to be moved forward in time if they overlap with a transition period.

Figure 7:
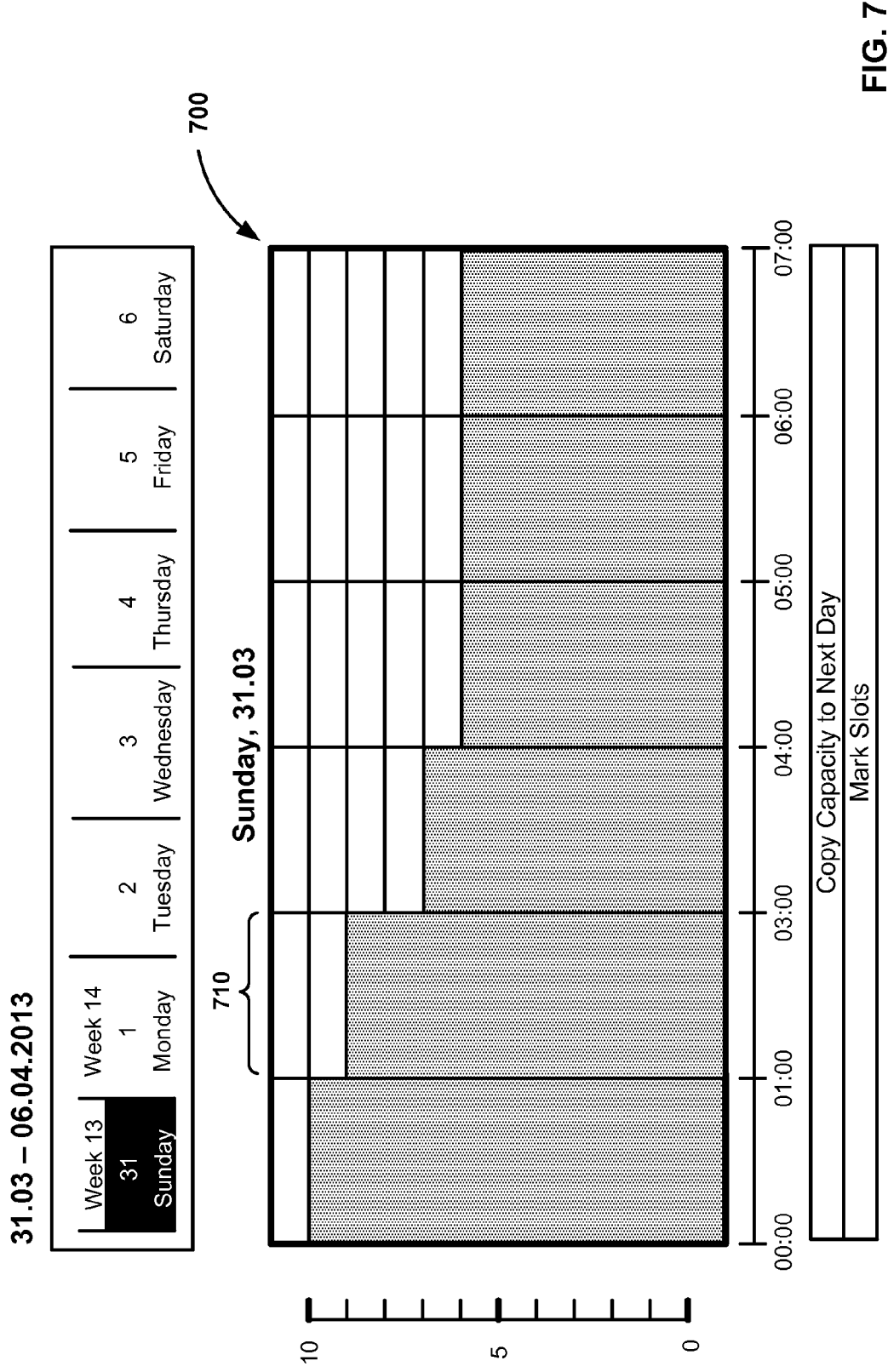
FIG. 7 is a block diagram illustrating an exemplary time grid with prolonged slot that overlaps with a transition period that is a result of a shift to DST, according to one embodiment.

FIG. 7 illustrates an exemplary time grid 700 with prolonged slot 710, according to one embodiment. Time grid 700 includes generated time slots for Sunday, 31.03.2013 in local CET time. In one embodiment, a request to generate slot 710 in CET time is received. The slot is requested to be generated from "01:00:00 AM" to "02:00:00 AM" on Sunday, Mar. 31, 2013 in local CET time. Since the requested slot overlaps with a transition period that is a result of the shift to DST, time slot 710 is prolonged from "01:00:00 AM" to "03:00:00 AM" as represented in local time. In local time slot 710 prolonged from "01:00:00 AM" to "03:00:00 AM" has duration of one hour in UTC time (i.e., "00:00:00 AM-01:00:00 AM"). The duration of time slot 710 as defined in UTC is with duration of one hour as the standard slot length. Thus, although time slot 710 is prolonged, the illustrated length of time slot 710 is based on its duration as defined in UTC. The capacity assigned to the slot is the capacity associated with the one hour standard length of this particular slot. For example, time slot 710 is assigned capacity '9'. Although time slot 710 is prolonged, its illustrated capacity is equal to the standard capacity, since the prolongation factor equals one and it is based on the duration of time slot 710 as defined in UTC.

Figure 8:
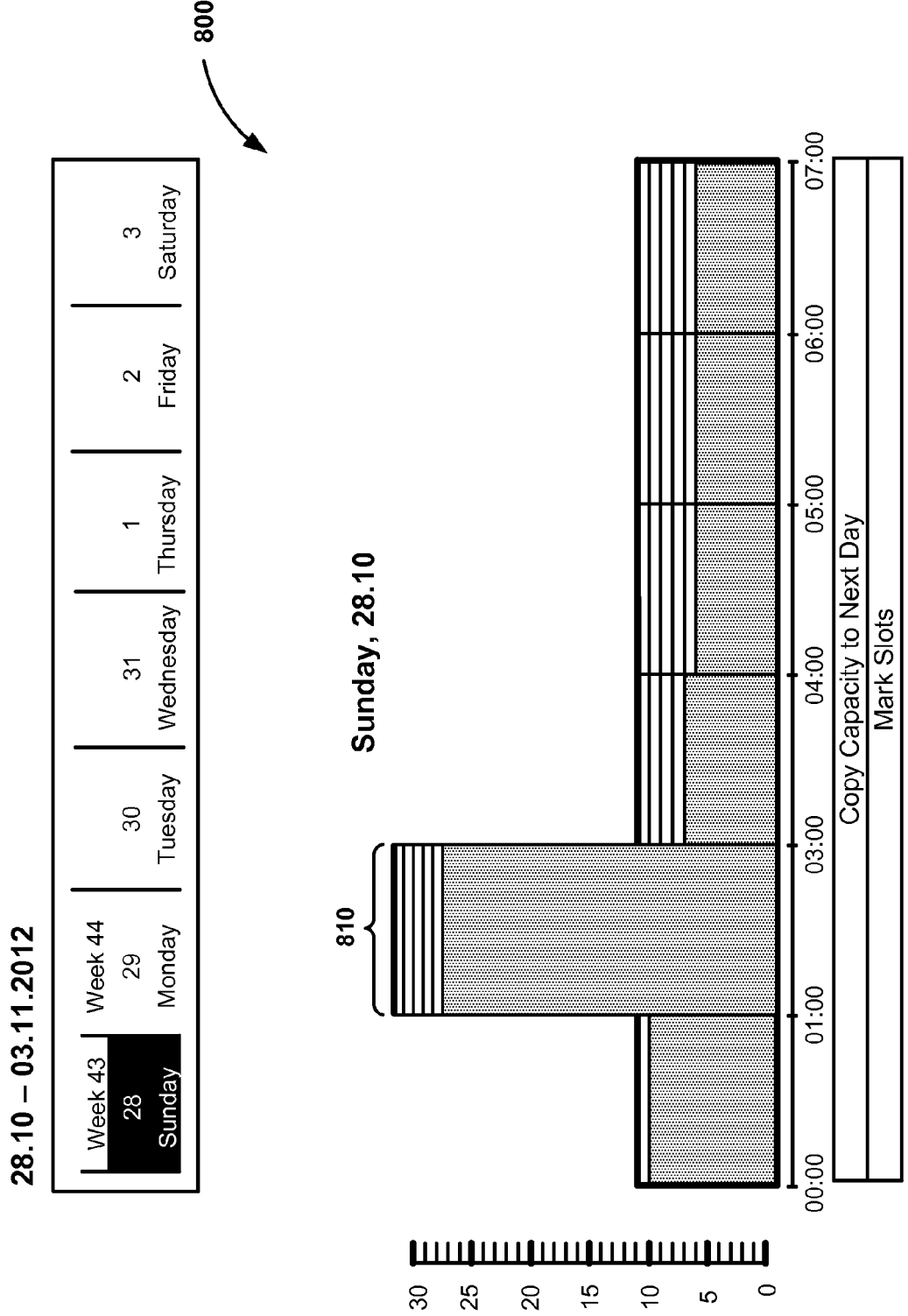
FIG. 8 is a block diagram illustrating an exemplary time grid with prolonged slot that overlaps with a transition period that is a result of a shift to non-DST, according to one embodiment.

FIG. 8 is a block diagram illustrating an exemplary time grid 800 with prolonged slot 810 that overlaps with a transition period that is a result of a shift to non-DST, according to one embodiment. Time grid 800 includes generated time slots for Sunday, 28.10.2012 in local CET time. In one embodiment, a request to generate a slot in CET time is received. The slot is requested to be generated from "01:00:00 AM" to "02:00:00 AM" on Sunday, 28.10.2013 in local CET time. Since the requested slot overlaps with a transition period that is a result of the shift to non-DST, the time slot 810 is prolonged from "01:00:00 AM" to "03:00:00 AM" as represented in local time. The prolonged time slot 810 from "01:00:00 AM" to "03:00:00 AM" in local time has duration of three hours in UTC time, i.e., "11:00:00 PM-02:00:00 AM" (not graphically illustrated in FIG. 8). The requested regular capacity of time slot 810 is increased by multiplying the regular capacity by a prolongation factor. The prolongation factor is a ratio between a time length of the prolonged slot as defined in UTC (i.e., three hours) and the regular time length (i.e., one hour). The capacity assigned to the slot is the regular capacity multiplied by three. In one embodiment, if the prolonged slot overlaps with two standard slots, the regular capacity is determined as an average of the capacity of the two slots. The prolonged time slot 810 overlaps with two standard slots, one with capacity "8" and another with capacity "9". The average capacity of these two slots equals "8.5". Thus, the capacity assigned to slot 810 equals "25.5", which is determined by multiplying "8.5" by a factor of three.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
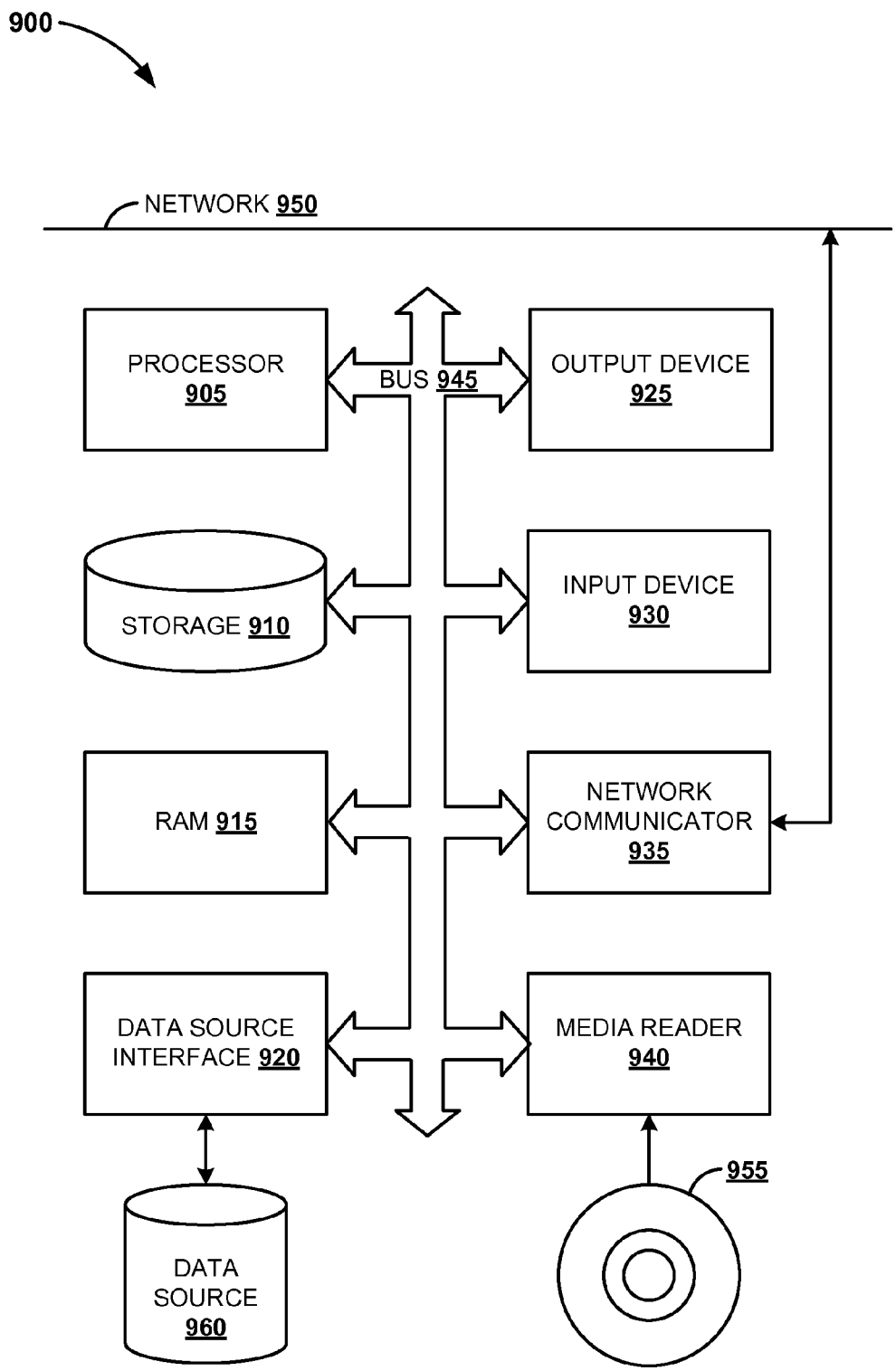
FIG. 9 is a block diagram illustrating an exemplary computer system, according to one embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to plan across time zones, the method comprising:
    defining a time slot of regular time length and capacity in time local to a time zone, wherein the slot is defined by a local time start timestamp and a local time end timestamp;
    upon determining that the local time end timestamp of the slot overlaps with a transition period, prolonging the time slot beyond the transition period;
    correspondingly defining the prolonged time slot by an international standard time start timestamp and an international standard time end timestamp; and
    generating the time slot based on the international standard time start timestamp and the international standard time end timestamp.

2. The method of claim 1 further comprising:
    in response to prolonging the slot, adjusting the regular capacity of the slot by multiplying the regular capacity by a prolongation factor, wherein the prolongation factor is a ratio between a time length of the prolonged slot defined in the international standard time and the regular time length; and
    associating the adjusted capacity with the prolonged slot.

3. The method of claim 1, wherein correspondingly defining the prolonged time slot by the international standard time start timestamp and the international standard time end timestamp further comprises:
    converting the start timestamp of the slot from local time to a corresponding start timestamp defined in the international standard time;
    upon determining that the local time end timestamp of the slot overlaps with a transition period that is a result of a shift to daylight saving time (DST), subtracting one hour from the end timestamp of the slot in local time to change the end timestamp to a time that is correspondingly defined in the international standard time;
    converting the changed end timestamp from local time to the international standard time;
    adding one hour to the converted to the international standard time end timestamp; and
    converting the end timestamp with the added one hour from the international standard time to local time to prolong the time slot.

4. The method of claim 1, wherein correspondingly defining the prolonged time slot by the international standard time start timestamp and the international standard time end timestamp further comprises:
    converting the start timestamp of the slot from local time to a corresponding start timestamp defined in the international standard time;
    upon determining that the local time end timestamp of the slot overlaps with a transition period that is a result of a shift to non-DST, prolonging the slot by adding the regular time length to the end timestamp of the time slot represented in local time until the end timestamp is beyond the transition period; and
    converting the prolonged end timestamp of the slot from local time to the international standard time.

5. The method of claim 1 further comprising:
    receiving a template planning period, wherein the template planning period including a first plurality of slots of regular time length, and wherein slots from the plurality of slots are assigned capacity; and
    copying the template planning period to at least one planning period.

6. The method of claim 5, wherein copying the template planning period to the at least one planning period further comprises:
    generating a second plurality of slots in the at least one planning period corresponding to the first plurality of slots of the template planning period; and
    copying capacity of the first plurality of slots of the template planning period to the corresponding second plurality of slots of the at least one planning period.

7. The method of claim 6, wherein generating the second plurality of slots in the at least one planning period further comprises:

generating the second plurality of slots in a sequence of slots, wherein a start timestamp of a slot from the second plurality of slots is an end timestamp of a previous slot in the sequence of slots, and wherein a start timestamp of a slot first in sequence in the second plurality of slots is an end timestamp of a slot last in sequence in the first plurality of slots.

8. A computer system to plan across time zones, the system including:

a memory to store computer executable instructions; and
a processor coupled to the memory to execute the instructions to:

define a time slot of regular time length and capacity in time local to a time zone, wherein the slot is defined by a local time start timestamp and a local time end timestamp;

upon determining that the local time end timestamp of the slot overlaps with a transition period, prolonging the time slot beyond the transition period;

correspondingly define the prolonged time slot by an international standard time start timestamp and an international standard time end timestamp; and generate the time slot based on the international standard time start timestamp and the international standard time end timestamp.

9. The system of claim 8 further to:

in response to prolonging the slot, adjust the regular capacity of the slot by multiplying the regular capacity by a prolongation factor, wherein the prolongation factor is a ratio between a time length of the prolonged slot defined in the international standard time and the regular time length; and associate the adjusted capacity with the prolonged slot.

10. The system of claim 8, wherein correspondingly defining the prolonged time slot by the international standard time start timestamp and the international standard time end timestamp further comprises:

convert the start timestamp of the slot from local time to a corresponding start timestamp defined in the international standard time;

upon determining that the local time end timestamp of the slot overlaps with a transition period that is a result of a shift to daylight saving time (DST), subtract one hour from the end timestamp of the slot in local time to change the end timestamp to a time that is correspondingly defined in the international standard time;

convert the changed end timestamp from local time to the international standard time; add one hour to the converted to the international standard time end timestamp; and convert the end timestamp with the added one hour from the international standard time to local time to prolong the time slot.

11. The system of claim 8, wherein correspondingly defining the prolonged time slot by the international standard time start timestamp and the international standard time end timestamp further comprises:

convert the start timestamp of the slot from local time to a corresponding start timestamp defined in the international standard time;

upon determining that the local time end timestamp of the slot overlaps with a transition period that is a result of a shift to non-DST, prolong the slot by adding the regular time length to the end timestamp of the time slot represented in local time until the end timestamp is beyond the transition period; and convert the prolonged end timestamp of the slot from local time to the international standard time.

12. The system of claim 8 further to:

receive a template planning period, wherein the template planning period including a first plurality of slots of regular time length, and wherein slots from the plurality of slots are assigned capacity; and copy the template planning period to at least one planning period.

13. The system of claim 12, wherein copying the template planning period to the at least one planning period further comprises:

generate a second plurality of slots in the at least one planning period corresponding to the first plurality of slots of the template planning period, and copy capacity of the first plurality of slots of the template planning period to the corresponding second plurality of slots of the at least one planning period.

14. The system of claim 13, wherein generating the second plurality of slots in the at least one planning period further comprises:

generate the second plurality of slots in a sequence of slots, wherein a start timestamp of a slot from the second plurality of slots is an end timestamp of a previous slot in the sequence of slots, and wherein a start timestamp of a slot first in sequence in the second plurality of slots is an end timestamp of a slot last in sequence in the first plurality of slots.

15. A non-transitory computer readable medium storing instructions thereon, which when executed by a processor cause a computer system to:

define a time slot of regular time length and capacity in time local to a time zone, wherein the slot is defined by a local time start timestamp and a local time end timestamp;

upon determining that the local time end timestamp of the slot overlaps with a transition period, prolonging the time slot beyond the transition period;

correspondingly define the prolonged time slot by an international standard time start timestamp and an international standard time end timestamp; and generate the time slot based on the international standard time start timestamp and the international standard time end timestamp.

16. The computer readable medium of claim 15, wherein the instructions when executed by the processor cause the computer system further to:

in response to prolonging the slot, adjust the regular capacity of the slot by multiplying the regular capacity by a prolongation factor, wherein the prolongation factor is a ratio between a time length of the prolonged slot defined in the international standard time and the regular time length; and associate the adjusted capacity with the prolonged slot.

17. The computer readable medium of claim 15, wherein correspondingly defining the prolonged time slot by the international standard time start timestamp and the international standard time end timestamp further comprises:

convert the start timestamp of the slot from local time to a corresponding start timestamp defined in the international standard time;

upon determining that the local time end timestamp of the slot overlaps with a transition period that is a result of a shift to daylight saving time (DST), subtract one hour from the end timestamp of the slot in local time to change the end timestamp to a time that is correspondingly defined in the international standard time;

convert the changed end timestamp from local time to the international standard time;

add one hour to the converted to the international standard time end timestamp; and convert the end timestamp with the added one hour from the international standard time to local time to prolong the time slot.

18. The computer readable medium of claim 15, wherein correspondingly defining the prolonged time slot by the international standard time start timestamp and the international standard time end timestamp further comprises:

convert the start timestamp of the slot from local time to a corresponding start timestamp defined in the international standard time; upon determining that the local time end timestamp of the slot overlaps with a transition period that is a result of a shift to non-DST, prolong the slot by adding the regular time length to the end timestamp of the time slot represented in local time until the end timestamp is beyond the transition period; and convert the prolonged end timestamp of the slot from local time to the international standard time.

19. The computer readable medium of claim 15 further to:

receive a template planning period, wherein the template planning period including a first plurality of slots of regular time length, and wherein slots from the plurality of slots are assigned capacity; and copy the template planning period to at least one planning period.

20. The computer readable medium of claim 19, wherein copying the template planning period to the at least one planning period further comprises:

generate a second plurality of slots in the at least one planning period corresponding to the first plurality of slots of the template planning period; and copy capacity of the first plurality of slots of the template planning period to the corresponding second plurality of slots of the at least one planning period.

* * * * *